US012261740B2

(12) United States Patent
Rajagopalan et al.

(10) Patent No.: US 12,261,740 B2
(45) Date of Patent: Mar. 25, 2025

(54) PLACEMENT OF CONTAINERIZED APPLICATIONS IN A NETWORK FOR EMBEDDED CENTRALIZED DISCOVERY CONTROLLER (CDC) DEPLOYMENT

(71) Applicant: DELL PRODUCTS L.P., Round Rock, TX (US)

(72) Inventors: Balaji Rajagopalan, Sunnyvale, CA (US); Pawan Kumar Singal, Milpitas, CA (US); Joseph Lasalle White, San Jose, CA (US); Charles Park, San Jose, CA (US); Ning Zhuang, San Jose, CA (US); Sreejith Sethumadhavan, Fremont, CA (US); Dhanunjayareddy Madhana, Guntur (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/869,727

(22) Filed: Jul. 20, 2022

(65) Prior Publication Data

US 2024/0031221 A1    Jan. 25, 2024

(51) Int. Cl.
*H04L 41/0806* (2022.01)
*H04L 41/044* (2022.01)
(Continued)

(52) U.S. Cl.
CPC ........ *H04L 41/0806* (2013.01); *H04L 41/044* (2013.01); *H04L 41/0816* (2013.01); *H04L 41/12* (2013.01)

(58) Field of Classification Search
CPC ..... H04L 43/10; H04L 41/0893; H04L 41/12; H04L 43/0811; H04L 41/065; H04L 45/245; H04L 45/70; H04L 43/0805
See application file for complete search history.

(56) References Cited

U.S. PATENT DOCUMENTS 10,606,454 B2    3/2020 Pani
11,218,378 B1    1/2022 Chaganti
(Continued)

OTHER PUBLICATIONS

Non-Final Office Action, mailed Jun. 27, 2023, in related matter U.S. Appl. No. 17/863,798, (18pgs).

(Continued)

*Primary Examiner* — Tonia L Dollinger
*Assistant Examiner* — Joseph M Cousins
(74) *Attorney, Agent, or Firm* — BAUGH LAW, LLC

(57) ABSTRACT

System and method embodiments of centralized discovery controller (CDC) services on a switching network fabric are disclosed. Nodes on the switching network fabric are categorized into leader nodes, e.g., spine switches, and follower nodes, e.g., leaf switches. The CDC services may be divided into centralized CDC services and distributed CDC services, which have direct connections to endpoints for seamless horizontal scaling of endpoints. The centralized CDC services may be placed on a leader node, and the distributed CDC services may be placed among the follower nodes. Operations of the CDC services may be monitored. In case of a node failure, CDC services deployed on the failed node may be moved or transferred to one or more other nodes that have the same role as the failed node. Implementations of the CDC service placement embodiments enable seamless horizontal scaling for endpoints and provide capability for more visibility and monitoring of endpoint.

20 Claims, 6 Drawing Sheets

(51) Int. Cl.
*H04L 41/0816* (2022.01)
*H04L 41/12* (2022.01)

(56) References Cited

U.S. PATENT DOCUMENTS

| | | | |
|---|---|---|---|
| 11,469,958 B1 | 10/2022 | Mackie | |
| 2009/0083390 A1* | 3/2009 | Abu-Ghazaleh | H04L 47/70 |
| | | | 709/209 |
| 2009/0144720 A1 | 6/2009 | Roush | |
| 2011/0167466 A1 | 7/2011 | Aiouaz | |
| 2013/0067049 A1 | 3/2013 | Ghosh | |
| 2014/0156667 A1 | 6/2014 | Kapadia | |
| 2014/0198686 A1* | 7/2014 | Kamble | H04L 41/044 |
| | | | 370/254 |
| 2015/0124644 A1 | 5/2015 | Pani | |
| 2016/0149776 A1 | 5/2016 | Pani | |
| 2017/0315522 A1 | 11/2017 | Kwon | |
| 2018/0011699 A1 | 1/2018 | Manthiramoorthy | |
| 2018/0227182 A1 | 8/2018 | Patton | |
| 2018/0241617 A1 | 8/2018 | Radzikowski | |
| 2018/0246731 A1 | 8/2018 | Regmi | |
| 2018/0375825 A1 | 12/2018 | Nataraja | |
| 2019/0037033 A1 | 1/2019 | Khakimov | |
| 2020/0293180 A1 | 9/2020 | Pani | |
| 2020/0396126 A1* | 12/2020 | L'Ecuyer | H04L 41/0886 |
| 2021/0042160 A1 | 2/2021 | Alamouti | |
| 2021/0055947 A1 | 2/2021 | Mahajan | |
| 2021/0157692 A1* | 5/2021 | MacCarthaigh | G06F 11/0757 |
| 2021/0360426 A1* | 11/2021 | Kumar | H04L 41/0897 |
| 2022/0014435 A1 | 1/2022 | Vadapalli | |

OTHER PUBLICATIONS

"Deploying Docker containers to a Cisco Catalyst 9300 with Cisco DNACenter," [online], [Retrieved Mar. 7, 2024].Retrieved from Internet <URL:https://ccie.tv/> CISCO, 2021. (13p).

Resposne filed Sep. 27, 2023, in related matter U.S. Appl. No. 17/863,798, (13 pgs).

Response filed Jun. 24, 2024 in realed U.S. Appl. No. 17/863,798, (15pgs).

Non-Final Office Action, mailed Mar. 28, 2024, in related matter U.S. Appl. No. 17/863,798, (12pgs).

Notice of Allowance and Fee(s) Due, mailed Sep. 25, 2024, in the related matter U.S. Appl. No. 17/863,798, (7pgs).

Non-Final Office Action, mailed Sep. 10, 2024, in related matter U.S. Appl. No. 17/870,351, (11pgs).

* cited by examiner

PLACEMENT OF CONTAINERIZED APPLICATIONS IN A NETWORK FOR EMBEDDED CENTRALIZED DISCOVERY CONTROLLER (CDC) DEPLOYMENT

BACKGROUND

A. Technical Field

The present disclosure relates generally to information handling system. More particularly, the present disclosure relates to systems and methods for placement of containerized applications in a topology for embedded CDC deployment.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The embedded deployment of cloud native centralized discovery controller or service (CDC) matches the current experience of a Storage Area Network (SAN) Fabric, where the control path and the I/O path uses the same network resources or link. In cloud-native application eco system, horizontal increase of nodes to handle user connections is a well-adopted design paradigm. In this paradigm, there are distributed services/entities, which handle user requests at scale very similar to edge computing paradigm, and central services/entities, which handle policies and its enforcement. The cluster of switches where the CDC is running is treated as a single entity and therefore have to resolve the following three fundamental requirements:
1. A singular endpoint, which requires a leader election algorithm;
2. An algorithm to dynamically place the distributed and centralized applications on appropriate switch resource based on CPU, memory, role of the switch and its proximity to the non-volatile memory express (NVMe) over Fabrics (NVMe-oF™) endpoints; and
3. In addition to all of the above the "switch resource" cluster need to provide high availability (HA)/redundancy so that services can be placed accordingly in case of hardware failure However, there are no commercially available solutions that may solve this problem as such solutions need intimate knowledge of the underling switching infrastructure.

Accordingly, it is highly desirable to find new, more efficient ways for placement of containerized applications for embedded CDC deployment.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
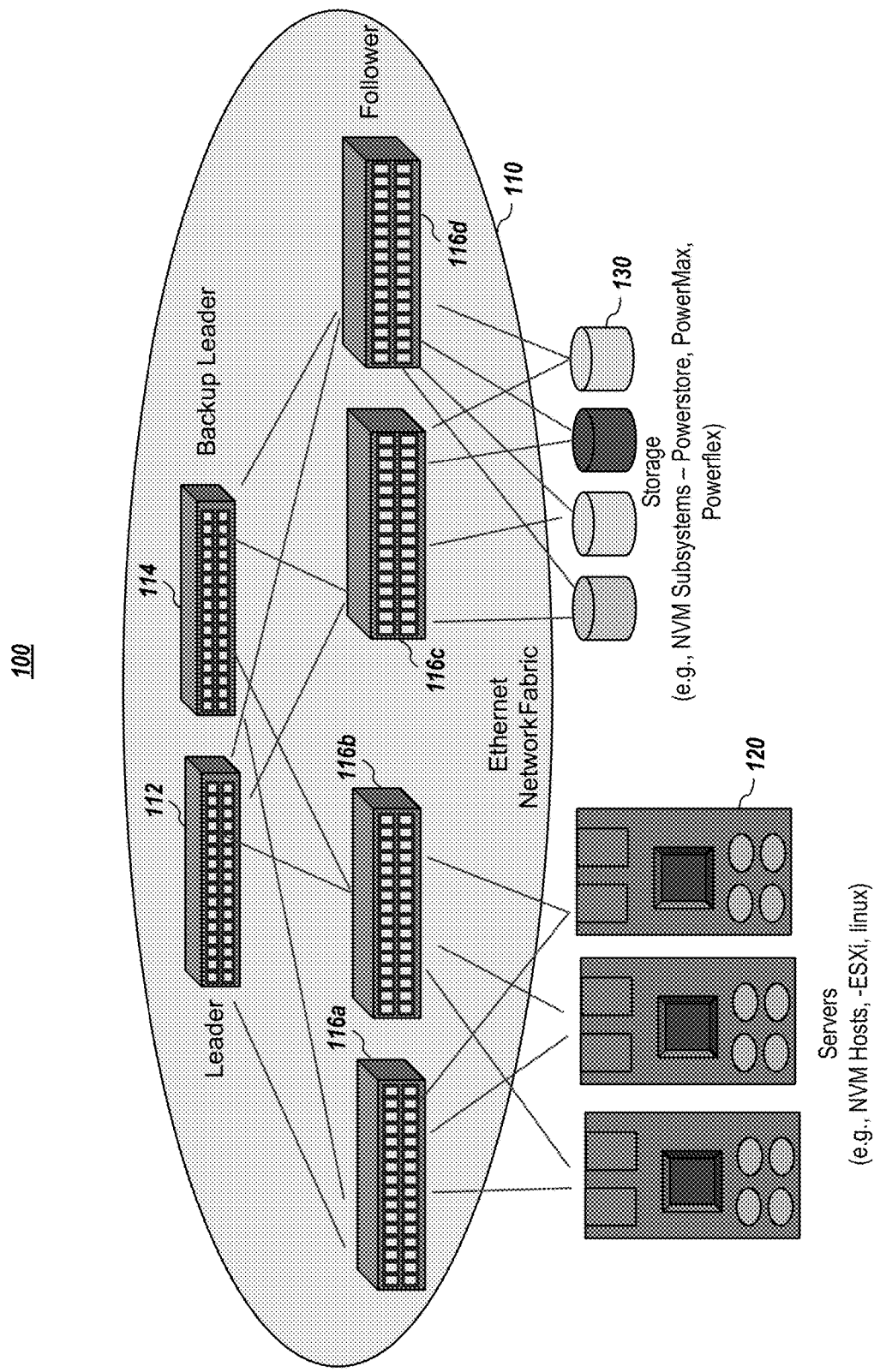
FIG. 1 ("FIG. 1") depicts a structure diagram of a multistage switching network fabric with a CLOS topology, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. Embodiments of Services Deployment on a Network Fabric

FIG. 1 depicts a structure diagram of a multistage switching network fabric, according to embodiments of the present disclosure. The multistage switching network 110 comprises a leader switch or node 112 and a backup leader switch or node 114, both of which communicatively couple to a plurality of follower switches or nodes 116a-116d. In one or more embodiments, may have a CLOS topology with the leader switches 112 and 114 as spine switches and the follower switches 116a-116d as leaf switches. The leader nodes and the follower nodes provide configurable and dedicated communication paths for connections between endpoints, such as one or more servers 120 and one or more storages 130. The servers 120 may be NVMe® host running on different platform, e.g., Linux, VMware, etc. The storages 130 may be nonvolatile memory (NVM) subsystems (e.g., PowerStore, PowerMax, or Powerflex, etc. by Dell, Inc. of Round Rock, Texas).

On-premises (on-prem) data center handling converged traffic prefers CLOS network topology, where the leaf nodes connect directly to the compute devices and the storages devices, and the spine switches provides fabric level connectivity between the leaf switches.

Figure 2:
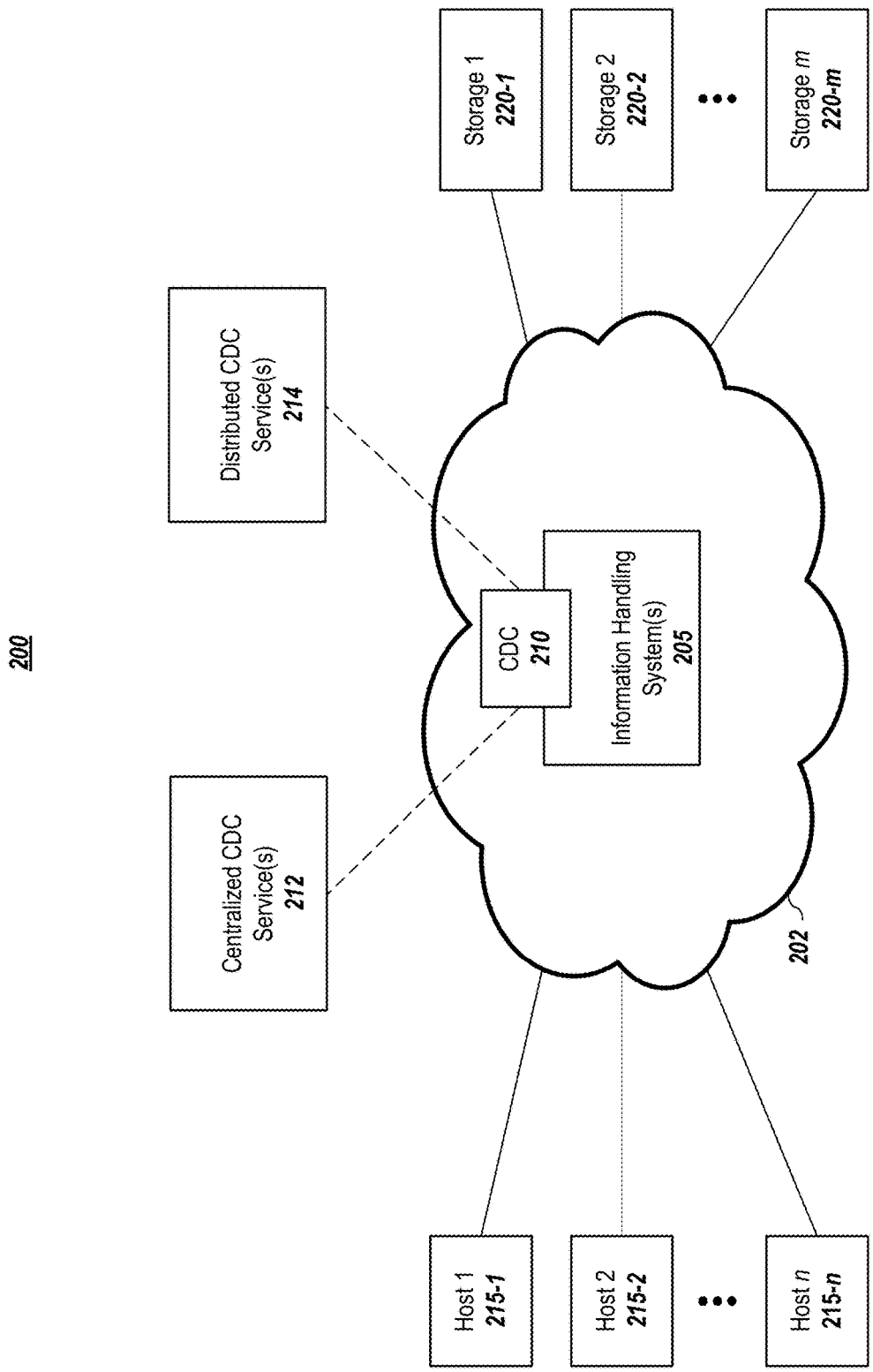
FIG. 2 depicts a network fabric with deployed CDC, according to embodiments of the present disclosure.

FIG. 2 depicts a network 202 with deployed CDC, according to embodiments of the present disclosure. The CDC 210 represents an entity that maintain the pertinent fabric information and provides a single or centralized management interface for control and management of the NVMe-oF™ network. In one or more embodiments, the CDC 210 may be placed in an information handling system 205, such as a switching network fabric, within the network 202 for various CDC services. Also depicted in FIG. 2 are hosts 215 and storage devices 220 that may be configured for access between the different devices.

In one or more embodiments, CDC may provide various connectivity broker services to host and subsystems. It connects to host and subsystems, fetches the information from each of these devices, keeps them in a name server database, etc. The CDC may provide various functions or services, such as name/zone services, notifications, database synchronization, etc. For example, CDC may provide zoning services to enforce connectivity between the host and subsystem, and/or vice-versa, based on the zoning policies. In addition, discovery of new host/subsystem(s) may trigger notifications, e.g., asynchronous event notifications (AENs), about NVMe® endpoints about the change in connectivity. CDC may provide multicast Domain Name System (mDNS) services for service advertisement, such that an end-host may automate the connectivity to the CDC. Furthermore, the CDC may provide user interfaces (UIs) for an administrator for CDC service management.

In one or more embodiments, CDC functionality may be divided into two categories, centralized service(s) 212 and distributed service(s) 214. Centralized services are CPU/memory intensive and need to be placed on switches which have high CPU/Memory capacity and have connectivity to the distributed services. Examples of centralized services may comprise, but are not limited to, policy framework (e.g., zoning), monitoring and reporting, and/or user access to CDC, along with other services. Distributed services have lower CPU/memory requirements and may be horizontally scaled on lower powered switches. Distributed services are preferably placed closer to the endpoints. Examples of distributed services may comprise, but are not limited to, NVMe® protocol termination, and transmission of discovery information (e.g., mDNS). Both exemplary distributed services are directly associated with number of connections to handle.

Figure 3:
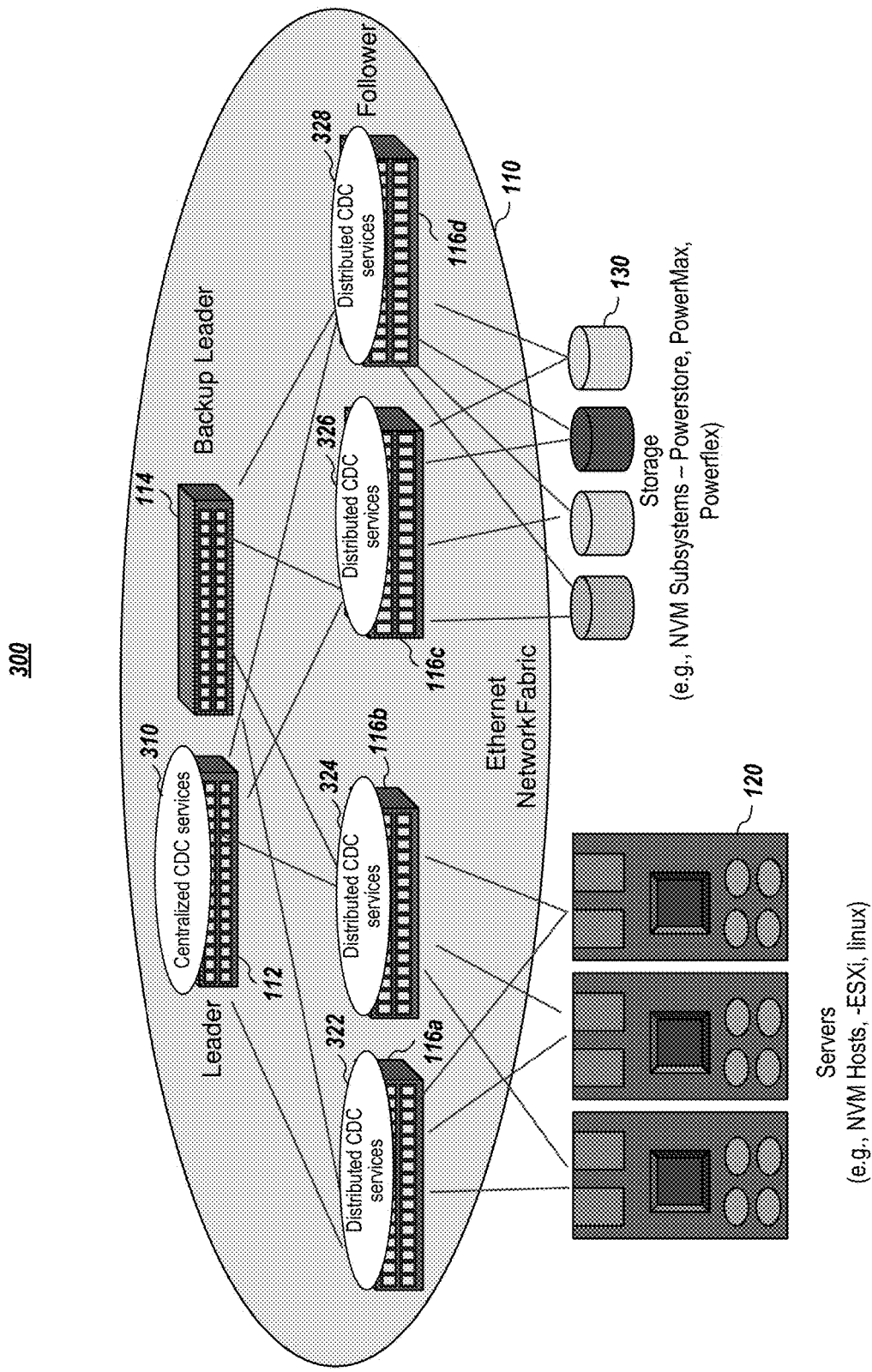
FIG. 3 depicts deployment of centralized services and distributed services on the switching network fabric, according to embodiments of the present disclosure.

FIG. 3 depicts deployment of centralized services and distributed services on the switching network fabric, according to embodiments of the present disclosure. One or more centralized services 310 are deployed or placed on the leader node 112 and a plurality of distributed services 322-328 are placed among the follower nodes 116a-116d. The centralized services 210 have connectivity and impact to the distributed services. With such a placement approach, localization of fault domain may be achieved, and horizontal scale of endpoint may be seamless since such a horizontal scaling may be supported by adding more leaf switches only to the network fabrics. Furthermore, local termination of endpoint may provide capability for more visibility and monitoring as the endpoints are directly connected to distributed services or applications for information such as link-state, Link Layer Discovery Protocol (LLDP), MAC learn, Address Resolution Protocol (ARP), etc.

Regarding cluster buildout, in one or more embodiments of the present disclosure, the role of the leader nodes and the follower nodes may be dynamic and determined via home grown methodology. Cluster may range from 1 node to n nodes based on customer's traffic needs. Given a redundancy cluster with any set of qualified nodes, one of the nodes may become a leader node. By way of comparison to container orchestration platforms like Kubernetes (an open-source container orchestration system) running on a server, cluster buildout has to be done manually—wherein the leader node and follower or worker nodes are specified explicitly. Also, from a redundancy perspective, in container orchestration platforms like Kubernetes, there must be an odd number for the leader and follower nodes; therefore, there is a specific minimum of six nodes needed.

Regarding service placement, in one or more embodiments of the present disclosure, services are categorized as centralized services (running on a leader node) and distributed services (running on follower nodes). Centralized services may have a full view of the network fabric and distributed services may operate on edge computing paradigm where in the control plane services are placed close to the ones they need to be handled. The Domain Name System (DNS) service of leader node determination at given time may be maintained by the placement service, which may be purely governed by role, position of switches in the network fabric and switch proximity to endpoints. In one or more embodiments, the placement services may operate in a redundant fashion for both centralized services and distributed services. The placement service managers switch failures. In case of failures of a switch, the placement services require no user intervention and automatically move the service(s) from the switch to the right switch/node. As a comparison, some container orchestration platforms like Kubernetes running on a server, service placement is governed by Kubernetes placement strategies which includes fixed pre-canned policies for redundancy. In case of failures of nodes, manual intervention would be required.

Regarding computation resource failures, in one or more embodiments of the present disclosure, placement services may operate on 1: N redundancy model for leader node election with no minimum requirement for quorum. New leader node may be chosen automatically, based on appropriate available resources, e.g., CPU/Memory/Location in the CLOS topology of the network fabric. Furthermore, the placement services may update the DNS automatically in case of leader node change, so that the DNS update may be visible to all the services in the network. As a comparison, some container orchestration platforms like Kubernetes running on a server, computation resource failure requires manual intervention, to maintain minimum quorum requirement.

In one or more embodiments of the present disclosure, in case of reboot or replacement for a follower/worker node, services placed on the follower/worker node may be moved or transferred to one or more other follower/worker nodes such that the services may be continued instead of being suspended or halted. Furthermore, multipathing, which is supported by the NVMe-oF™ protocol's inherent redundancy model, may be implemented to facilitate the service transfer.

In one or more embodiments, the separated deployment of the centralized/distributed services on a leader node and follower nodes may effectively limit the impact of any misbehaved hosts to directly connected local follower node(s), and thus prevent the disturbance of any host misbehaving to the whole network fabrics.

Figure 4:
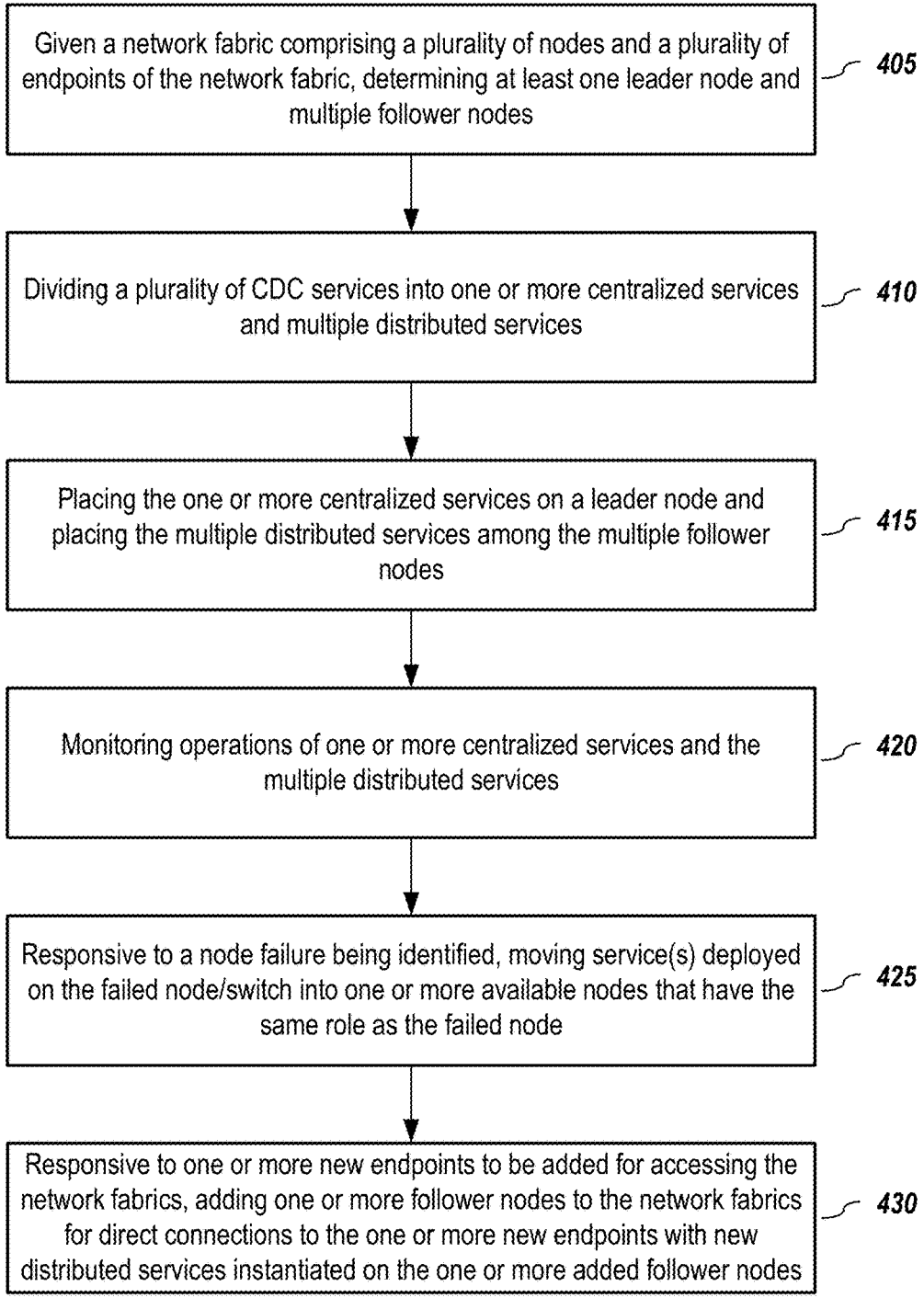
FIG. 4 depicts a process for placement of centralized services and distributed services on the switching network fabric, according to embodiments of the present disclosure.

FIG. 4 depicts a process for placement of centralized services and distributed services on the switching network fabric, according to embodiments of the present disclosure. In step 405, given a network fabric comprising a plurality of nodes and a plurality of endpoints of the network fabric, one or more leader nodes and multiple follower nodes are determined. In one or more embodiments, the role of leader node and follower nodes may be determined dynamically based on one or more parameters, such as topology of the network fabric, computation resources (CPU/memory) of the plurality of nodes, node proximity of endpoints, etc. In step 410, a plurality of CDC services, e.g., SmartFabric Network Controller (SFNC) services provided by Dell, Inc. of Round Rock, Texas, are divided into one or more centralized services and multiple distributed services. In step 415, the one or more centralized services are placed on a leader node and the multiple distributed services are placed among the multiple follower nodes. The service placement may be determined by one or more factors, e.g., role, position of the nodes/switches in the network fabrics and their proximity to the endpoints. In step 420, operations of the one or more centralized services and the multiple distributed services are monitored. The monitored operations may comprise switch working conditions, whether the computation resources on the deployed nodes are overloaded, whether one or more operation parameters for the centralized and/or distributed services reach predetermined thresholds, etc. In step 425, responsive to a node/switch failure being identified, the service(s) deployed on the failed node/switch are moved into one or more available nodes/switches that have the same role as the failed node/switch. For example, when a leader node failure is identified, the centralized service(s) deployed on the failed leader switch are moved into a backup leader node; while when a follower node failure is identified, the distributed service(s) deployed on the failed follower switch are moved into one or more other follower nodes. When one follower node e.g., a leaf switch, deployed with multiple distributed services is failed, the multiple distributed services may be moved together into one available follower node, or distributed among multiple available nodes depending on statuses of the multiple available nodes, requirements of the multiple distributed services, proximity of the multiple available nodes to endpoint(s) to which the one leaf switch connects, etc.

In one or more embodiments, the process for placement of CDC services may further comprise a step for horizontal scaling of distributed CDC services for added endpoints. In step 430, responsive to one or more new endpoints to be added for accessing the network fabrics, one or more follower nodes (e.g., leaf switches) are added to the network fabrics for direct connections to the one or more new endpoints with new distributed services instantiated on the one or more added follower nodes. With this approach, horizontal scaling of endpoints is seamless as such a scaling only needs to add more follower nodes (e.g., leaf switches) to the network fabric.

In one or more embodiments, services may be deployed dynamically on network switches such that the services may be closer to endpoints. Embodiments of dynamic placement of services closer to endpoint are described in co-pending and commonly-owned U.S. patent application Ser. No. 17/870,351, filed on 21 Jul. 2022, entitled "DYNAMIC PLACEMENT OF SERVICES CLOSER TO ENDPOINT," which is incorporated by reference herein in its entirety.

In one or more embodiments, containerized applications deployed on network switches may comprise third-party applications. Embodiments of third-party applications on network switches are described in co-pending and commonly-owned U.S. patent application Ser. No. 17/863,798, filed on 13 Jul. 2022, entitled "SYSTEMS AND METHODS FOR DEPLOYING THIRD-PARTY APPLICATIONS ON A CLUSTER OF NETWORK SWITCHES," which is incorporated by reference herein in its entirety.

B. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid-state drive, or both), one or more network ports for communicating with external devices as well as various input and output (I/O) devices. The computing system may also include one or more buses operable to transmit communications between the various hardware components.

Figure 5:
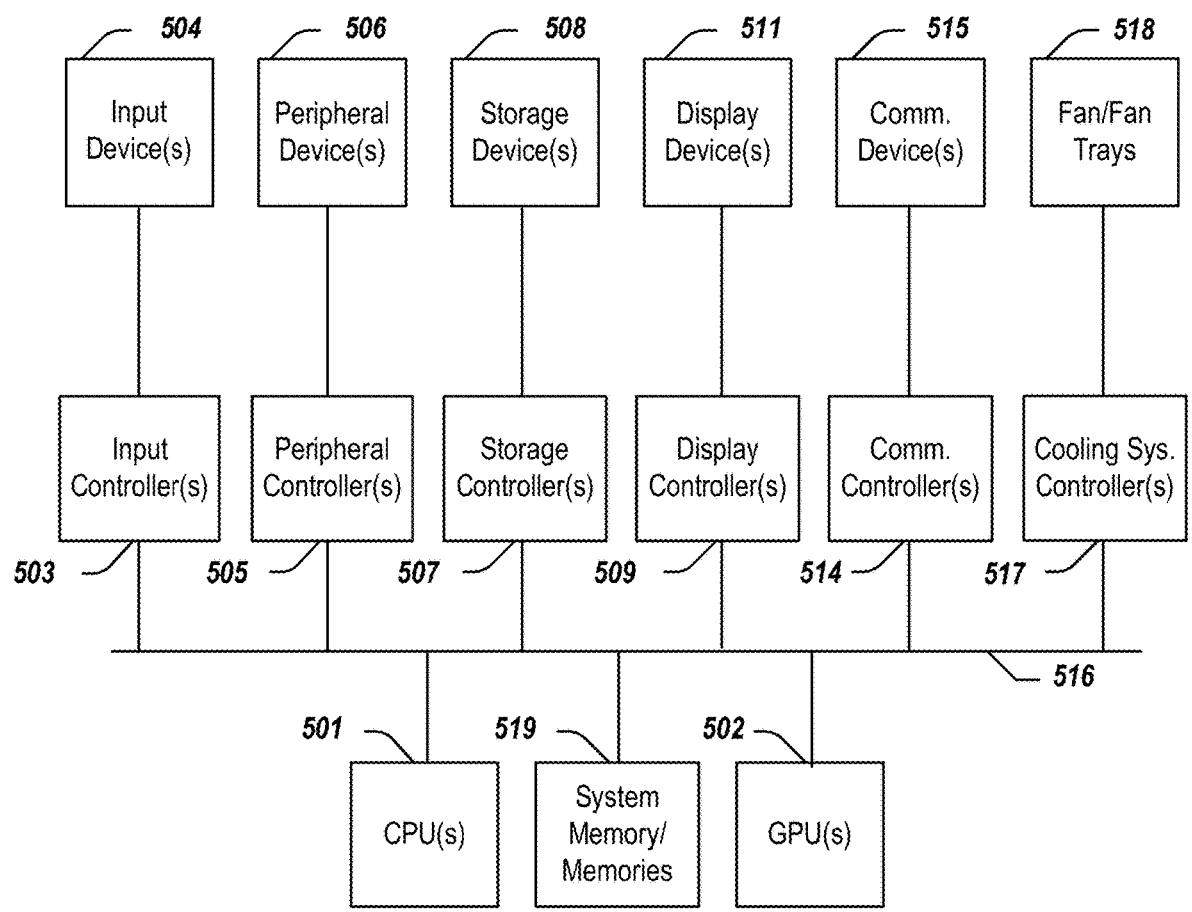
FIG. 5 depicts a simplified block diagram of an information handling system, according to embodiments of the present disclosure.

FIG. 5 depicts a simplified block diagram of an information handling system (or computing system), according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more CPUs 501 that provides computing resources and controls the computer. CPU 501 may be implemented with a microprocessor or the like and may also include one or more graphics processing units (GPU) 502 and/or a floating-point coprocessor for mathematical computations. In one or more embodiments, one or more GPUs 502 may be incorporated within the display controller 509, such as part of a graphics card or cards. The system 500 may also include a system memory 519, which may comprise RAM, ROM, or both.

A number of controllers and peripheral devices may also be provided, as shown in FIG. 5. An input controller 503 represents an interface to various input device(s) 504, such as a keyboard, mouse, touchscreen, stylus, microphone, camera, trackpad, display, etc. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT) display, a thin film transistor (TFT) display, organic light-emitting diode, electroluminescent panel, plasma panel, or any other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 500 comprises one or more fans or fan trays 518 and a cooling subsystem controller or controllers 517 that monitors thermal temperature(s) of the system 500 (or components thereof) and operates the fans/fan trays 518 to help regulate the temperature.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 6:
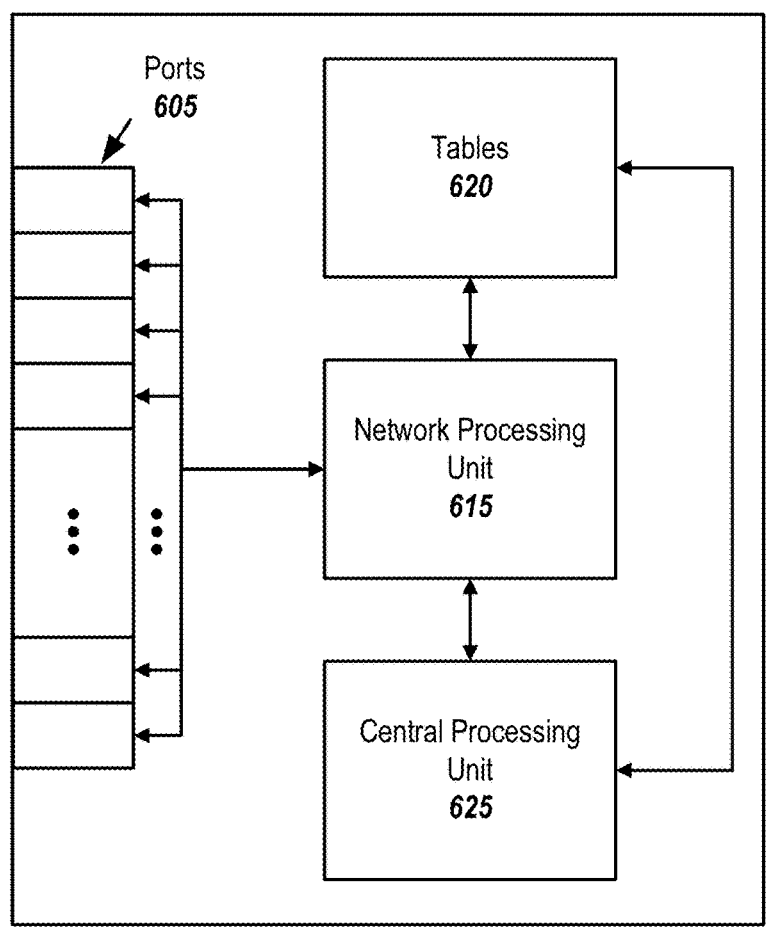
FIG. 6 depicts an alternative block diagram of an information handling system, according to embodiments of the present disclosure.

FIG. 6 depicts an alternative block diagram of an information handling system, according to embodiments of the present disclosure. It will be understood that the functionalities shown for system 600 may operate to support various embodiments of the present disclosure—although it shall be understood that such system may be differently configured and include different components, additional components, or fewer components.

The information handling system 600 may include a plurality of I/O ports 605, a network processing unit (NPU) 615, one or more tables 620, and a CPU 625. The system includes a power supply (not shown) and may also include other components, which are not shown for sake of simplicity.

In one or more embodiments, the I/O ports 605 may be connected via one or more cables to one or more other network devices or clients. The network processing unit 615 may use information included in the network data received at the node 600, as well as information stored in the tables 620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for placement of centralized discovery controller (CDC) services comprising:
given a plurality of endpoints and a network fabric comprising a plurality of nodes comprising at least one leader node and multiple follower nodes in the network fabric:
dividing a plurality of CDC services into one or more centralized services and multiple distributed services, the one or more centralized services configured to have connectivity to the multiple distributed services;
placing the one or more centralized services on a leader node on the at least one leader node; and
placing the multiple distributed services on or distributed across the multiple follower nodes, the multiple distributed services being placed closer to the plurality of endpoints than the one or more centralized services are to the plurality of endpoints.

2. The computer-implemented method of claim 1 further comprising:
monitoring operations of the one or more centralized services and the multiple distributed services; and
responsive to failure of a node that is placed with at least one CDC service, moving or transferring the at least one CDC service to one or more other nodes that have a same role as the failed node.

3. The computer-implemented method of claim 2 wherein:
responsive to the failed node being the leader node, moving the one or more centralized services to a backup leader node; and
responsive to the failed node being a follower node, moving one or more distributed services placed on the follower node to one or more other follower nodes.

4. The computer-implemented method of claim 3 wherein the backup leader node is chosen automatically based on available resources of the network fabric, and a Domain Name System (DNS) service is updated automatically by a placement service as part of a leader node change so that the DNS service update is available to all CDC other services in the network fabric.

5. The computer-implemented method of claim 1 wherein the at least one leader node and the multiple follower nodes are determined dynamically by a placement service that uses one or more factors comprising role of a node and position of a node in the network fabric.

6. The computer-implemented method of claim 1 wherein determining at least one leader node and multiple follower nodes involves at least one of:
   a role for each node in a topology of the network fabric; and
   a location for each node in the topology of the network fabric.

7. The computer-implemented method of claim 1 wherein:
   responsive to one or more new endpoints to be added for accessing the network fabric,
   adding one or more follower nodes to the network fabrics, the one or more added follower nodes having connections to the one or more new endpoints with new distributed services instantiated on the one or more added follower nodes.

8. An information handling system for placement of centralized discovery controller (CDC) services comprising:
   one or more processors; and
   a non-transitory computer-readable medium or media comprising one or more sets of instructions which, when executed by at least one of the one or more processors, causes steps to be performed comprising:
      determining at least one leader node and multiple follower nodes in a network fabric that comprises a plurality of nodes;
      dividing a plurality of CDC services into one or more centralized services and multiple distributed services, the one or more centralized services configured to have connectivity to the multiple distributed services;
      placing the one or more centralized services on a leader node on the at least one leader node; and
      placing the multiple distributed services on or distributed across the multiple follower nodes, the multiple distributed services being placed closer to a plurality of endpoints than the one or more centralized services are to the plurality of endpoints.

9. The information handling system of claim 8 wherein the non-transitory computer-readable medium or media further comprises one or more sequences of instructions which, when executed by at least one of the one or more processors, causes steps to be performed comprising:
   monitoring operations of the one or more centralized services and the multiple distributed services; and
   responsive to failure of a node that is placed with at least one CDC service, moving or transferring the at least one CDC service to one or more other nodes that have a same role as the failed node.

10. The information handling system of claim 9 wherein:
    responsive to the failed node being the leader node, moving the one or more centralized services to a backup leader node; and
    responsive to the failed node being a follower node, moving one or more distributed services placed on the follower node to one or more other follower nodes.

11. The information handling system of claim 10 wherein the backup leader node is chosen automatically based on available resources of the network fabric, and a Domain Name System (DNS) service is updated automatically by a placement as part of a leader node change so that the DNS service update is available to other services in the network fabric.

12. The information handling system of claim 8 wherein the at least one leader node and the multiple follower nodes are determined dynamically by a placement service that uses one or more factors comprising role of a node and position of a node in the network fabric.

13. The information handling system of claim 8 wherein the non-transitory computer-readable medium or media further comprises one or more sequences of instructions which, when executed by at least one of the one or more processors, causes steps to be performed comprising:
    responsive to one or more new endpoints to be added for accessing the network fabrics, adding one or more follower nodes to the network fabric, the one or more added follower nodes having connections to the one or more new endpoints with new distributed services instantiated on the one or more added follower nodes.

14. A non-transitory computer-readable medium or media comprising one or more sequences of instructions which, when executed by at least one processor, causes steps for placement of centralized discovery controller (CDC) services comprising:
    given a plurality of endpoints and a network fabric comprising a plurality of nodes comprising at least one leader node and multiple follower nodes in the network fabric:
       dividing a plurality of CDC services into one or more centralized services and multiple distributed services, the one or more centralized services configured to have connectivity to the multiple distributed services;
       placing the one or more centralized services on a leader node on the at least one leader node; and
       placing the multiple distributed services on the multiple follower nodes, the multiple distributed services being placed closer to the plurality of endpoints than the one or more centralized services are to the plurality of endpoints.

15. The non-transitory computer-readable medium or media of claim 14 wherein determining at least one leader node and multiple follower nodes involves at least one of:
    a role for each node in a topology of the network fabric; and
    a location for each node in the topology of the network fabric.

16. The non-transitory computer-readable medium or media of claim 14 wherein the at least one leader node and the multiple follower nodes are determined dynamically by a placement service that uses one or more factors comprising role of a node and position of a node in the network fabric.

17. The non-transitory computer-readable medium or media of claim 14 further comprising one or more sequences of instructions which, when executed by at least one processor, causes steps to be performed comprising:
    monitoring operations of the one or more centralized services and the multiple distributed services; and
    responsive to failure of a node that is placed with at least one CDC service, moving or transferring the at least one CDC service to one or more other nodes that have a same role as the failed node.

18. The non-transitory computer-readable medium or media of claim 17 wherein:
    responsive to the failed node being the leader node, moving the one or more centralized services to a backup leader node; and
    responsive to the failed node being a follower node, moving one or more distributed services placed on the follower node to one or more other follower nodes.

19. The non-transitory computer-readable medium or media of claim 14 further comprising one or more sequences of instructions which, when executed by at least one processor, causes steps to be performed comprising:

responsive to one or more new endpoints to be added for accessing the network fabric, adding one or more follower nodes to the network fabrics, the one or more added follower nodes having connections to the one or more new endpoints with new distributed services instantiated on the one or more added follower nodes.

20. The non-transitory computer-readable medium or media of claim 18 wherein the backup leader node is chosen automatically based on available resources of the network fabric, and a Domain Name System (DNS) service is updated automatically by a placement as part of a leader node change so that the DNS service update is available to other services in the network fabric.

* * * * *